United States Patent
Kilby et al.

(10) Patent No.: US 9,141,926 B2
(45) Date of Patent: Sep. 22, 2015

(54) SMART MOBILE APPLICATION DEVELOPMENT PLATFORM

(71) Applicant: Kofax, Inc., Irvine, CA (US)

(72) Inventors: Steven Kilby, Rancho Santa Margarita, CA (US); Anthony Macciola, Chino Hills, CA (US); Jan W. Amtrup, Chevy Chase, MD (US); Bruce Orcutt, Newport Beach, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/259,866

(22) Filed: Apr. 23, 2014

(65) Prior Publication Data

US 2014/0317595 A1 Oct. 23, 2014

Related U.S. Application Data

(60) Provisional application No. 61/815,210, filed on Apr. 23, 2013.

(51) Int. Cl.
| | |
|---|---|
| *G06F 3/048* | (2013.01) |
| *G06F 9/44* | (2006.01) |
| *G06Q 10/06* | (2012.01) |
| *H04W 4/02* | (2009.01) |

(52) U.S. Cl.
CPC ............ *G06Q 10/06316* (2013.01); *G06F 8/20* (2013.01); *H04W 4/02* (2013.01); *H05K 999/00* (2013.01)

(58) Field of Classification Search
CPC ....... G06Q 10/06316; G06F 8/20; G06F 8/34; G06F 3/0484
See application file for complete search history.

(56) References Cited

U.S. PATENT DOCUMENTS

| | | | |
|---|---|---|---|
| 3,069,654 A | 12/1962 | Hough | |
| 4,656,665 A | 4/1987 | Pennebaker | |

(Continued)

FOREIGN PATENT DOCUMENTS

| | | |
|---|---|---|
| EP | 0549329 A2 | 6/1993 |
| EP | 0767578 A2 | 4/1997 |

(Continued)

OTHER PUBLICATIONS

Giner et al., Implicit interaction design for pervasive workflows, Apr. 2011, 10 pages.*

(Continued)

*Primary Examiner* — Thuy Dao
(74) *Attorney, Agent, or Firm* — Zilka-Kotab, PC

(57) ABSTRACT

A method includes receiving user input defining a workflow comprising one or more activities and one or more rules; receiving user input defining a user interface (UI) configured to facilitate a user performing the workflow at least in part using a processor of a mobile device; and generating a mobile software application based on the workflow and the UI. In another embodiment, a method includes: instantiating a mobile application on a mobile device; launching a workflow within the mobile application, the workflow comprising one or more activities and one or more rules; rendering one or more user interfaces based at least in part on the workflow; displaying at least one of the user interfaces on a display of the mobile device; receiving user input via at least one of the user interfaces; and modifying the workflow based at least partially on user input. Systems and computer program products are also disclosed.

27 Claims, 4 Drawing Sheets

(56) References Cited

U.S. PATENT DOCUMENTS

| | | |
|---|---|---|
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,124,810 A | 6/1992 | Seto |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,313,527 A | 5/1994 | Guberman et al. |
| 5,317,646 A | 5/1994 | Sang, Jr. et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,696,611 A | 12/1997 | Nishimura et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,781,665 A | 7/1998 | Cullen et al. |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,867,264 A | 2/1999 | Hinnrichs |
| 5,937,084 A | 8/1999 | Crabtree et al. |
| 5,953,388 A | 9/1999 | Walnut et al. |
| 5,987,172 A | 11/1999 | Michael |
| 6,005,958 A | 12/1999 | Farmer et al. |
| 6,009,191 A | 12/1999 | Julier |
| 6,009,196 A | 12/1999 | Mahoney et al. |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |

(56) References Cited

U.S. PATENT DOCUMENTS

| | | |
|---|---|---|
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Büttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,545,529 B2 | 6/2009 | Borrey et al. |
| 7,553,095 B2 | 6/2009 | Kimura et al. |
| 7,562,060 B2 | 7/2009 | Sindhwani et al. |
| 7,580,557 B2 | 8/2009 | Zavadsky et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,738,730 B2 | 6/2010 | Hawley |
| 7,739,127 B1 | 6/2010 | Hall |
| 7,752,556 B2* | 7/2010 | Forstall et al. ............... 715/761 |
| 7,761,391 B2 | 7/2010 | Schmidtler et al. |
| 7,778,457 B2 | 8/2010 | Nepomniachtchi et al. |
| 7,787,695 B2 | 8/2010 | Nepomniachtchi et al. |
| 7,937,345 B2 | 5/2011 | Schmidtler et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,094,976 B2 | 1/2012 | Berard et al. |
| 8,103,536 B2* | 1/2012 | Green et al. ............... 705/7.27 |
| 8,135,656 B2 | 3/2012 | Evanitsky |
| 8,194,965 B2 | 6/2012 | Lossev et al. |
| 8,239,335 B2 | 8/2012 | Schmidtler et al. |
| 8,244,031 B2 | 8/2012 | Cho et al. |
| 8,261,233 B2* | 9/2012 | Szpak et al. ............... 717/105 |
| 8,279,465 B2 | 10/2012 | Couchman |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,424,063 B2* | 4/2013 | Uchida ............... 726/4 |
| 8,452,098 B2 | 5/2013 | Nepomniachtchi et al. |
| 8,483,473 B2 | 7/2013 | Roach et al. |
| 8,503,797 B2 | 8/2013 | Turkelson et al. |
| 8,510,751 B2* | 8/2013 | Saha et al. ............... 719/313 |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,620,058 B2 | 12/2013 | Nepomniachtchi et al. |
| 8,639,621 B1 | 1/2014 | Ellis et al. |
| 8,656,181 B2* | 2/2014 | Balinsky et al. ............... 713/189 |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,749,839 B2 | 6/2014 | Borrey et al. |
| 8,774,516 B2 | 7/2014 | Amtrup et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0026479 A1 | 2/2003 | Thomas et al. |
| 2003/0044012 A1 | 3/2003 | Eden |
| 2003/0046445 A1 | 3/2003 | Witt et al. |
| 2003/0101161 A1 | 5/2003 | Ferguson et al. |
| 2003/0120653 A1 | 6/2003 | Brady et al. |
| 2003/0142328 A1 | 7/2003 | McDaniel et al. |
| 2003/0156201 A1 | 8/2003 | Zhang |
| 2003/0210428 A1 | 11/2003 | Bevlin et al. |
| 2003/0223615 A1 | 12/2003 | Keaton et al. |
| 2004/0021909 A1 | 2/2004 | Kikuoka |
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0193325 A1 | 9/2005 | Epstein |
| 2005/0204058 A1 | 9/2005 | Philbrick et al. |
| 2005/0216426 A1 | 9/2005 | Weston et al. |
| 2005/0228591 A1 | 10/2005 | Hur et al. |
| 2005/0234955 A1 | 10/2005 | Zeng et al. |

(56) References Cited

U.S. PATENT DOCUMENTS

| | | |
|---|---|---|
| 2005/0246262 A1 | 11/2005 | Aggarwal et al. |
| 2005/0265618 A1 | 12/2005 | Jebara |
| 2005/0271265 A1 | 12/2005 | Wang et al. |
| 2006/0023271 A1 | 2/2006 | Boay et al. |
| 2006/0031344 A1 | 2/2006 | Mishima et al. |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0159364 A1 | 7/2006 | Poon et al. |
| 2006/0161646 A1* | 7/2006 | Chene et al. .................. 709/223 |
| 2006/0195491 A1 | 8/2006 | Nieland et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1* | 10/2006 | Luo et al. ....................... 717/105 |
| 2006/0242180 A1 | 10/2006 | Graf et al. |
| 2006/0256392 A1 | 11/2006 | Van Hoof et al. |
| 2006/0263134 A1 | 11/2006 | Beppu |
| 2006/0265640 A1 | 11/2006 | Albornoz et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2007/0002348 A1 | 1/2007 | Hagiwara |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0089078 A1 | 4/2009 | Bursey |
| 2009/0175537 A1 | 7/2009 | Tribelhorn et al. |
| 2009/0214112 A1 | 8/2009 | Borrey et al. |
| 2009/0228499 A1 | 9/2009 | Schmidtler et al. |
| 2010/0060910 A1 | 3/2010 | Fechter |
| 2010/0060915 A1 | 3/2010 | Suzuki et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0232706 A1 | 9/2010 | Forutanpour |
| 2010/0280859 A1 | 11/2010 | Frederick, II et al. |
| 2011/0013039 A1 | 1/2011 | Aisaka et al. |
| 2011/0060910 A1* | 3/2011 | Gormish et al. ............... 713/176 |
| 2011/0116716 A1 | 5/2011 | Kwon et al. |
| 2011/0145178 A1 | 6/2011 | Schmidtler et al. |
| 2011/0196870 A1 | 8/2011 | Schmidtler et al. |
| 2011/0246076 A1 | 10/2011 | Su et al. |
| 2011/0249905 A1 | 10/2011 | Singh et al. |
| 2012/0089906 A1* | 4/2012 | Reeves et al. .................. 715/255 |
| 2012/0114249 A1 | 5/2012 | Conwell |
| 2012/0116957 A1 | 5/2012 | Zanzot et al. |
| 2012/0162527 A1 | 6/2012 | Baker |
| 2012/0194692 A1 | 8/2012 | Mers et al. |
| 2012/0272192 A1* | 10/2012 | Grossman et al. ............ 715/854 |
| 2012/0284122 A1 | 11/2012 | Brandis |
| 2013/0022231 A1 | 1/2013 | Nepomniachtchi et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0139148 A1* | 5/2013 | Berg et al. ..................... 717/177 |
| 2013/0152176 A1 | 6/2013 | Courtney et al. |
| 2013/0167020 A1* | 6/2013 | Farmer et al. ................. 715/255 |
| 2013/0182002 A1 | 7/2013 | Macciola et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0230246 A1 | 9/2013 | Nuggehalli |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0075413 A1* | 3/2014 | Binjrajka ....................... 717/121 |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270536 A1 | 9/2014 | Amtrup et al. |

FOREIGN PATENT DOCUMENTS

| | | |
|---|---|---|
| EP | 0936804 A2 | 8/1999 |
| EP | 1128659 A1 | 8/2001 |
| EP | 1317133 A1 | 6/2003 |
| EP | 1422920 A2 | 5/2004 |
| EP | 1956518 A1 | 8/2008 |
| EP | 1959363 A2 | 8/2008 |
| EP | 1976259 A1 | 10/2008 |

(56) References Cited

FOREIGN PATENT DOCUMENTS

| | | |
|---|---|---|
| JP | 9116720 | 5/1997 |
| JP | 09062876 A | 7/1997 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 | 1/2005 |
| JP | 2005173730 A | 6/2005 |
| JP | 2006209588 A | 8/2006 |
| JP | 2008134683 A | 6/2008 |
| TW | 401553 | 8/2000 |
| WO | 9604749 | 2/1996 |
| WO | 9847098 A1 | 10/1998 |
| WO | 9967731 A1 | 12/1999 |
| WO | 02063812 | 8/2002 |
| WO | 2004053630 A2 | 6/2004 |
| WO | 2006104627 A1 | 10/2006 |
| WO | 2008008142 A2 | 1/2008 |
| WO | 2010030056 | 3/2010 |

OTHER PUBLICATIONS

Realinho et al., An event-driven workflow framework to develop context-aware mobile applications, Dec. 2012, 10 pages.*
Romeikat et al., Policy-driven workflows for mobile network management automation, Jun. 2010, 5 pages.*
Meschtscherjakov, Mobile work efficiency: enhancing workflows with mobile devices, Aug. 2011, 4 pages.*
U.S. Appl. No. 13/802,226, filed Mar. 13, 2013.
U.S. Appl. No. 14/209,825, filed Mar. 13, 2014.
U.S. Appl. No. 14/177,136, filed Feb. 10, 2014.
U.S. Appl. No. 14/175,999, filed Feb. 7, 2014.
U.S. Appl. No. 14/220,016, filed Mar. 19, 2014.
U.S. Appl. No. 14/220,023, filed Mar. 19, 2014.
U.S. Appl. No. 14/220,029, filed Mar. 19, 2014.
U.S. Appl. No. 61/819,463, filed May 3, 2013.
U.S. Appl. No. 61/883,865, filed Sep. 27, 2013.
U.S. Appl. No. 61/905,063, filed Nov. 15, 2013.
Eight-point algorithm, downloaded from http://en.wikipedia.org/wiki/Eight-point_algorithm, Last Modified on Apr. 18, 2014, pp. 1-7.
"AutoMatch," www.ucoa.com/products/automatch, retrieved Jan. 22, 2009.
"The American Heritage College Dictionary; Fourth Edition," Definition of "relationship," 2004.
Advisory Action from U.S. Appl. No. 11/752,691, dated Dec. 24, 2013.
Allwein et al., "Reducing Multiclass to Binary: A Unifying Approach for Margin Classifiers," Journal of Machine Learning Research vol. 1, 2000, pp. 113-141.
Angulo et al., "A multi-class Support Vector Machine," ECML, Barcelona, Spain, 2000, pp. 34-35.
Ayat et al., "Empirical Error based Optimization of SVM Kernels: Application to Digit Image Recognition," Proceedings of the Eighth International Workshop on Frontiers in Handwriting Recognition, IEEE, 2002, pp. 1-6.
Bennett et al., "A Support Vector Machine Approach to Decision Trees," IEEE, 1998, pp. 2396-2401.
Brauer et al., "Robust recognition of complex entities in text exploiting enterprise data and NLP-techniques," 2008 IEEE, Third International Conference on Digital Information Management, Nov. 13, 2008, pp. 551-558.
Bredensteiner et al., "Multicategory Classification by Support Vector Machines," Computational Optimization and Aoolications, 1999, pp. 1-30.
Campbell et al., "Machine Learning Strategies for Complex Tasks," Proceedings of First IEEE-RAS International Conference on Humanoid Robots, Springer Verlag, Cambridge, 2000, pp. 1-13.
Chen et al., "Learning with Progressive Transductive Support Vector Machine," Pattern Recognition Letters, vol. 24, 2003, pp. 1845-1855.
Collins-Thompson et al., "A Clustering-Based Algorithm for Automatic Document Separation," ACM Special Interest Group in Information Retrieval SIGIR, 2002, 6 pages.
Cover et al., "Elements of Information Theory, Second Edition," A Johnson Wiley & Sons, Inc. Publication, Jul. 2006, 774 pages.
Cristianini et al., "An Introduction to Support Vector Machines and Other Kernel-Based Learning Methods," pp. 8-11, 26-41, 92-101, 124-129, 2000.
Davy et al., "Improved Optimization of Time-Frequency-Based Signal Classifiers," IEEE Signal Processing Letters, vol. 8, No. 2, Feb. 2001, pp. 52-57.
Decision on Rejection from Chinese Application No. 200780001197.9 issued Mar. 22, 2013.
Decision on Rejection Translation from Japanese Application No. 2005-508441, dated Sep. 14, 2010.
Dietterich et al., "Solving Multiclass Learning Problems via Error-Correcting Output Codes," Journal of Artificial Intelligence Research 2, 1995, pp. 263-286.
Domingos, "MetaCost: A General Method for Making Classifiers Cost-Sensitive," Fifth International Conferences on Knowledge Discovery and Data Mining, Portugal, 1999, pp. 155-164.
Drucker et al., "Support Vector Machines for Spam Categorization," IEEE Transactions on Neural Networks, vol. 10. No. 5. Sep. 1999, pp. 1048-1054.
Duda et al., "Use of the Hough Transformation to Detect Lines and Curves in Pictures," Graphics and Image Processing, Communications of the ACM, vol. 15, No. 1, Jan. 1972, pp. 11-15.
Dumais et al., "Inductive Learning Algorithms and Representations for Text Categorization," In Proceedings of the ACM-CIKM98, Nov. 1998, pp. 148-155.
European Decision to Grant from European Application No. 04250855.6, dated Dec. 4, 2008.
European Office Communication and Exam Report from European Application No. 09770507.3, dated Dec. 3, 2013.
European Office Communication and Exam Report from European Application No. 10741580.4, dated Jan. 6, 2014.
European Office Communication and Extended European Search Report from European Application No. 09770507.3, dated Oct. 26, 2011.
European Office Communication and Supplementary Partial Search Report from European Application No. 03768631.8, dated Feb. 9, 2007.
European Office Communication from European Application No. 03768631.8, dated Apr. 2, 2009.
European Office Communication from European Application No. 03768631.8, dated Apr. 10, 2008.
European Office Communication from European Application No. 03768631.8, dated Jun. 25, 2007.
European Office Communication from European Application No. 04250855.6, dated Jan. 17, 2007.
European Office Communication from European Application No. 04250855.6, dated May 23, 2007.
European Office Communication from European Application No. 04250855.6, dated Nov. 6, 2007.
European Office Communication from European Application No. 06721118.5, dated Jul. 22, 2009.
European Supplementary European Search Report from European Application No. 10741580.4, dated Sep. 26, 2012.
Examiner's Answer to Appeal Brief from U.S. Appl. No. 10/742,131, dated Feb. 18, 2011.
Examiner's Answer to Appeal Brief from U.S. Appl. No. 11/329,999, dated Jan. 6, 2011.
Examiner's Answer to Appeal Brief from U.S. Appl. No. 11/329,999, dated Oct. 17, 2013.
Examiner's Answer to Appeal Brief from U.S. Appl. No. 12/163,822, dated Aug. 3, 2012.
Examiner's Answer to Appeal Brief from U.S. Appl. No. 12/206,594, dated Jul. 26, 2012.

(56) References Cited

OTHER PUBLICATIONS

Examiner's Answer to Appeal Brief from U.S. Appl. No. 12/206,594, dated Mar. 16, 2012.
Final Office Action from U.S. Appl. No. 10/412,163, dated Feb. 27, 2007.
Final Office Action from U.S. Appl. No. 10/742,131, dated Apr. 14, 2009.
Final Office Action from U.S. Appl. No. 10/742,131, dated Jun. 10, 2010.
Final Office Action from U.S. Appl. No. 11/329,999, dated Jun. 21, 2010.
Final Office Action from U.S. Appl. No. 11/752,673, dated Jun. 3, 2010.
Final Office Action from U.S. Appl. No. 11/752,691, dated Sep. 3, 2010.
Final Office Action from U.S. Appl. No. 11/752,691, dated Sep. 12, 2013.
Final Office Action from U.S. Appl. No. 11/752,719, dated May 28, 2010.
Final Office Action from U.S. Appl. No. 12/163,822, dated Dec. 15, 2011.
Final Office Action from U.S. Appl. No. 12/206,594, dated May 27, 2011.
Final Office Action from U.S. Appl. No. 12/331,875, dated Jun. 19, 2012.
Final Office Action from U.S. Appl. No. 13/090,216, dated Aug. 30, 2013.
Final Office Action from U.S. Appl. No. 13/898,407, dated Jan. 13, 2014.
Fragoudis et al., "Integrating Feature and Instance Selection for Text Classification," SIGKDD'02, ACM, Jul. 2002, pp. 501-506.
Guermeur et al., "A new multi-class SVM based on a uniform convergence result," IJCNN, Como, Italy, 2000, 6 pages.
Guo et al., "Face recognition by Support Vector Machines," Proc. of the International Conferences on Automatic Face and Gesture Recognition, 2000, pp. 196-201.
Hearst et al., "Trends and Controversies—Support Vector Machines," IEEE Intelligent Systems vol. 13 No. 4, 1998, pp. 18-28.
Hersh et al., "OHSUMED: An Interactive Retrieval Evaluation and New Large Test Collection for Research," In SIGIR'94, Springer London, Jan. 1994, pp. 192-201.
Hsu et al., "A Comparison of Methods for Multi-class Support Vector Machines," Journal of Artificial Societies & Social Simulation vol. 4, No. 2, 2000, 26 pages.
IBM, "Morphological Techniques for Determining Bounding Rectangles and Octagons," Technical Disclosure Bulletin, TDB-ACC-NO: NB9306177, vol. 1, Issue 6B, Jun. 1, 1993, pp. 177-182.
International Preliminary Exam Report from PCT Application No. PCT/US06/07150, dated Dec. 3, 2007.
International Preliminary Exam Report from PCT Application No. PCT/US06/07150, dated Feb. 4, 2011.
International Preliminary Report on Patentability from PCT Application No. PCT/US2007/013484, dated Jan. 22, 2009.
International Search Report and Written Opinion from PCT Application No. PCT/US07/013484, dated Oct. 1, 2008.
International Search Report and Written Opinion from PCT Application No. PCT/US09/02621, dated Jun. 12, 2009.
International Search Report and Written Opinion from PCT Application No. PCT/US10/023224, dated Apr. 5, 2010.
International Search Report and Written Opinion from PCT Application No. PCT/US2006/007150, dated Jun. 30, 2006.
International Search Report and Written Opinion from PCT Application No. PCT/US2010/023224, dated Aug. 25, 2011.
International Search Report and Written Opinion from PCT Application No. PCT/US2013/021336, dated Jan. 12, 2013.
International Search Report from European Application No. 03768631.8, dated Mar. 26, 2007.
International Search Report from International Application No. PCT/US03/35117, dated Aug. 26, 2005.
International Search Report from PCT Application No. PCT/US03/35117, dated Aug. 26, 2009.
International Search Report from PCT Application No. PCT/US2006/007150, dated Apr. 7, 2006.
International Written Opinion from PCT Application No. PCT/US2006/007150, dated Jul. 4, 2006.
INSTIG Information Co., Ltd., "CamScanner," www.intsig.com/en/camscanner.html, retrieved Oct. 25, 2012.
INSTIG Information Co., Ltd., "Product Descriptions," www.intsig.com/en/product.html, retrieved Oct. 25, 2012.
Jaakkola et al., "Maximum entropy discrimination," MIT Lab, 1999, pp. 1-26.
Jebara et al., "Feature Selection and Dualities in Maximum Entropy Discrimination," 16th Conference on Uncertainty in Artificial Intelligence, UAI 2000, Jul. 2000, pp. 1-10.
Jebara, T. "Discriminative, Generative and Imitative Learning," Doctoral Thesis, School of Architecture and Planning, Massachusetts Institute of Technology, Feb. 2002, pp. 1-212.
Joachims, "Estimating the generalization performance of a SVM efficiently," Proceedings of ICML-00, 17th International Conference on Machine Learning, Morgan Kaufmann Publishers, San Francisco, US, 2000, pp. 431-438.
Joachims, "Making Large Scale SVM Learning Practical" Advances in Kernel Methods-Support Vector Learning, MIT Press, Jun. 1998, pp. 1-13.
Joachims, "Text Categorization with Support Vector Machines: Learning with Many Relevant Features," 1997, pp. 1-14.
Joachims, T., "Transductive Inference for Text Classification using Support Vector Machines," ICML, vol. 99, 1999, pp. 1-10.
Joachims, T., "Transductive Learning via Spectral Graph Partitioning," Proceedings of the Twentieth International Conference on Machine Learning (ICML-2003), Washington DC, 2003, pp. 1-8.
Keerthi et al., "Improvements to Platt's SMO Algorithm for SVM Classifier Design," 2001 Massachusetts Institute of Technology, Neural Computation, vol. 13, pp. 637-649.
Kindermann et al., "Error Correcting Codes with Optimized Kullback-Leibler Distances for Text Categorization," PKDD 2001, Springer-Verlag, pp. 266-276.
Kolcz et al., "Summarization as Feature Selection for Text Categorization," CIKM'01, Nov. 2001, pp. 365-370.
Krinsky, "The Supreme Court, Stare Decisis, and the Role of Judicial Deference in Patent Claim Construction Appeals," bepress Legal Series, paper 1206, 2006, pp. 1-34.
Lai, "Conversational News Agent" Thesis, The University of New South Wales, Nov. 2002, pp. 1-95.
Lee et al., "Multicategory Support Vector Machines, Theory, and Application to the Classification of Microarray Data and Satellite Radiance Data," Technical report No. 1064, University of Wisconsin, Sep. 2002, pp. 1-36.
Liu et al., "Boosting to Correct Inductive Bias in Text Classification," CIKM'02, ACM, Nov. 4-9, 2002, pp. 348-355.
Matalas et al., "An Edge Detection Technique Using the Facet Model and Parameterized Relaxation Labeling," IEEE Transactions Pattern Analysis and Machine Intelligence vol. 19 Issue 4, Apr. 1997, pp. 328-341.
Matsuyama, "Expert Systems for Image Processing: Knowledge-based Composition of Image Analysis Processes," Computer Vision, Graphics, and Image Processing, vol. 48, Issue 1, Oct. 1989, pp. 22-49, Abstract Only.
Mayoraz et al., "Support Vector Machines for Multi-class Classification," IDIAP Research Report 98-06, May 1998, pp. 1-7.
Mohri, M., "Finite-State Transducers in Language and Speech Processing," Association for Computational Linguistics, vol. 23, 1997, pp. 1-42.
Moreira et al., "Improved Pairwise Coupling Classification with Correcting Classifiers," IDIAP-Research Report 97-09, Oct. 1997, pp. 1-11.
Morik et al., "Combining statistical learning with a knowledge-based approach—A case study in intensive care monitoring," In Proceedings of the International Conference on Machine Learning, 1999, pp. 268-277.

(56) References Cited

OTHER PUBLICATIONS

Nazif et al., "Low Level Image Segmentation: An Expert System," IEEE Transactions on Pattern Analysis and Machine Intelligence, vol. PAMI-6, Issue 5, Sep. 1984, pp. 555-577, Abstract Only.
Nigam, K.P., "Using Unlabeled Data to Improve Text Classification," Doctoral Thesis, Carnegie Mellon University, 2001, pp. 1-128.
Non-Final Office Action from U.S. Appl. No. 10/412,163, dated Aug. 29, 2006.
Non-Final Office Action from U.S. Appl. No. 10/412,163, dated Oct. 25, 2007.
Non-Final Office Action from U.S. Appl. No. 10/742,131, dated Mar. 27, 2008.
Non-Final Office Action from U.S. Appl. No. 10/742,131, dated Nov. 27, 2009.
Non-Final Office Action from U.S. Appl. No. 10/742,131, dated Oct. 15, 2008.
Non-Final Office Action from U.S. Appl. No. 11/329,753, dated Apr. 30, 2008.
Non-Final Office Action from U.S. Appl. No. 11/329,753, dated Nov. 5, 2008.
Non-Final Office Action from U.S. Appl. No. 11/329,753, dated Sep. 12, 2007.
Non-Final Office Action from U.S. Appl. No. 11/329,999, dated Feb. 3, 2010.
Non-Final Office Action from U.S. Appl. No. 11/329,999, dated Jul. 20, 2009.
Non-Final Office Action from U.S. Appl. No. 11/329,999, dated Oct. 27, 2009.
Non-Final Office Action from U.S. Appl. No. 11/752,673, dated Dec. 31, 2009.
Non-Final Office Action from U.S. Appl. No. 11/752,691, dated Apr. 25, 2013.
Non-Final Office Action from U.S. Appl. No. 11/752,691, dated Feb. 24, 2010.
Non-Final Office Action from U.S. Appl. No. 11/752,691, dated Jul. 13, 2011.
Non-Final Office Action from U.S. Appl. No. 11/752,719, dated Nov. 30, 2009.
Non-Final Office Action from U.S. Appl. No. 12/163,822, dated May 26, 2011.
Non-Final Office Action from U.S. Appl. No. 12/206,594, dated Dec. 10, 2010.
Non-Final Office Action from U.S. Appl. No. 12/331,875, dated Apr. 9, 2013.
Non-Final Office Action from U.S. Appl. No. 12/331,875, dated Dec. 22, 2011.
Non-Final Office Action from U.S. Appl. No. 12/368,685, dated Mar. 29, 2012.
Non-Final Office Action from U.S. Appl. No. 12/435,277, dated Apr. 15, 2011.
Non-Final Office Action from U.S. Appl. No. 12/435,277, dated Nov. 15, 2010.
Non-Final Office Action from U.S. Appl. No. 12/436,854, dated Jun. 8, 2012.
Non-Final Office Action from U.S. Appl. No. 12/721,393, dated Mar. 30, 2012.
Non-Final Office Action from U.S. Appl. No. 13/033,536, dated Dec. 27, 2011.
Non-Final Office Action from U.S. Appl. No. 13/090,216, dated Apr. 26, 2013.
Non-Final Office Action from U.S. Appl. No. 13/090,216, dated Aug. 23, 2012.
Non-Final Office Action from U.S. Appl. No. 13/544,830, dated Jan. 14, 2013.
Non-Final Office Action from U.S. Appl. No. 13/691,610, dated Mar. 1, 2013.
Non-Final Office Action from U.S. Appl. No. 13/898,407, dated Aug. 1, 2013.
Non-Final Office Action from U.S. Appl. No. 13/948,046, dated Dec. 6, 2013.
Non-Final Office Action from U.S. Appl. No. 14/078,402, dated Jan. 30, 2014.
Non-Final Office Action from U.S. Appl. No. 14/175,999, dated Apr. 3, 2014.
Non-Final Office Action from U.S. Appl. No. 14/176,006, dated Apr. 7, 2014.
Non-Final Office Action from U.S. Appl. No. 14/220,016, dated May 22, 2014.
Non-Final Office Action from U.S. Appl. No. 14/220,023, dated May 5, 2014.
Non-Final Office Action from U.S. Appl. No. 14/220,029, dated May 14, 2014.
Notice of Allowance from Japanese Application No. 2004-047112, dated Apr. 10, 2009.
Notice of Allowance from Japanese Application No. 2008-503002, dated Apr. 24, 2012.
Notice of Allowance from Japanese Application No. 2011-549266, dated Dec. 18, 2013.
Notice of Allowance from Japanese Application No. No. 2001-377498, dated Jul. 28, 2009.
Notice of Allowance from Taiwanese Application No. 096118505, dated Nov. 9, 2012.
Notice of Allowance from U.S. Appl. No. 10/412,163, dated Mar. 25, 2008.
Notice of Allowance from U.S. Appl. No. 10/742,131, dated Nov. 15, 2013.
Notice of Allowance from U.S. Appl. No. 11/329,753, dated Mar. 13, 2009.
Notice of Allowance from U.S. Appl. No. 11/329,999, dated Jan. 31, 2014.
Notice of Allowance from U.S. Appl. No. 11/752,634, dated Dec. 31, 2009.
Notice of Allowance frotn U.S. Appl. No. 11/752,673, dated Jan. 24, 2011.
Notice of Allowance from U.S. Appl. No. 11/752,719, dated Dec. 28, 2010.
Notice of Allowance from U.S. Appl. No. 11/805,857, dated Sep. 10, 2008.
Notice of Allowance from U.S. Appl. No. 12/050,096, dated Mar. 24, 2009.
Notice of Allowance from U.S. Appl. No. 12/102,419, dated Apr. 9, 2012.
Notice of Allowance from U.S. Appl. No. 12/331,875, dated Oct. 25, 2013.
Notice of Allowance from U.S. Appl. No. 12/368,685, dated Aug. 30, 2012.
Notice of Allowance from U.S. Appl. No. 12/435,277, dated Oct. 13, 2011.
Notice of Allowance from U.S. Appl. No. 12/436,854, dated Oct. 19, 2012.
Notice of Allowance from U.S. Appl. No. 12/721,393, dated Oct. 10, 2012.
Notice of Allowance from U.S. Appl. No. 13/033,536, dated Apr. 13, 2012.
Notice of Allowance from U.S. Appl. No. 13/080,163, dated May 1, 2013.
Notice of Allowance from U.S. Appl. No. 13/090,216, dated Dec. 24, 2013.
Notice of Allowance from U.S Appl. No. 13/544,830, dated Apr. 26, 2013.
Notice of Allowance from U.S. Appl. No. 13/691,610, dated Jun. 24, 2013.
Notice of Allowance from U.S. Appl. No. 13/740,123, dated Jul. 10, 2014.
Notice of Allowance from U.S. Appl. No. 13/898,407, dated Apr. 23, 2014.
Notice of Allowance from U.S. Appl. No. 13/948,046, dated Jun. 2, 2014.
Notice of Allowance from U.S. Appl. No. 14/078,402, dated Feb. 26, 2014.
Notice of Final Rejection from Japanese Application No. 2001-377498, dated Sep. 4, 2007.

(56) References Cited

OTHER PUBLICATIONS

Notice of Final Rejection Translation from Japanese Application No. 2008-503002, dated Dec. 27, 2011.
Notice of Ground of Rejection Translation from Japanese Application No. 2001-377498, dated Jul. 18, 2006.
Notice of Reasons for Rejection from Japanese Application No. 2009-519439, dated Sep. 7, 2012.
Notice of Reasons for Rejection Translation from Japanese Application No. 2004-047112, dated Dec. 22, 2008.
Notice of Reasons for Rejection Translation from Japanese Application No. 2005-508441, dated Jan. 19, 2010.
Notice of Reasons for Rejection Translation from Japanese Application No. 2008-503002, dated Oct. 21, 2009.
Notice of Reasons for Rejection Translation from Japanese Application No. 2008-503002, dated Sep. 30, 2010.
Notice of Reasons for Rejection Translation from Japanese Application No. 2011-549266, dated Sep. 4, 2013.
Office Action from Taiwanese Application No. 096118505, dated Sep. 7, 2011.
Office Action Summary from Chinese Application No. 200780001197.9, dated Jun. 9, 2010.
Office Action Summary from Chinese Application No. 200780001197.9, received Jul. 8, 2011.
Pan et al., "An Improved Constant-Time Algorithm for Computing the Radon and Hough Transforms on a Reconfigurable Mesh," IEEE Transactions on Systems, Man, and Cybernetics—Part A: Systems and Humans, vol. 29, No. 4, Jul. 1999, pp. 417-421.
Patent Board Decision on Appeal from U.S. Appl. No. 10/742,131, dated Aug. 27, 2013.
Pavel et al., "Efficient Algorithms for the Hough Transform on Arrays with Reconfigurable Optical Buses*," Department of Computing and Information Science, 1996, pp. 1-19.
Platt et al., "Large Margin DAGs for Multiclass Classification," Advances in Neural Information Processing Systems, vol. 12, 2000, pp. 547-553.
Platt, "Probabilistic outputs for Support Vector Machines and Comparisons to Regularized Likelihood Methods," Advances in Large Margin Classifiers, MIT Press, 1999, pp. 61-73.
Platt, J.C., "Fast Training of Support Vector Machines Using Sequential Minimal Optimization," Advances in Kernel Methods—Support Vector Learning, 1999, pp. 41-65.
Platt, J.C., "Probabilistic Outputs for Support Vector Machines and Comparisons to Regularized Likelihood Methods," Advances in Large Margin Classifiers, MIT Press, Mar. 26, 1999, pp. 1-11.
Press et al., "Numerical Recipes in C++: The Art of Scientific Computing Second Edition," Cambridge University, 2002, pp. 413-417.
Price et al., "Pairwise Neural Network Classifiers with Probabilistic Outputs, Neural Information Processing Systems," vol. 7, 1994, 8 pages.
Rainardi, V., "Building a Data Warehouse: With Examples in SQL Server," Chapter 15: Other Data Warehouse Usage, Apress, Dec. 27, 2007, pp. 471-474.
Rennie et al., "Improving Multiclass Text Classification with the Support Vector Machine," MIT Lab, Oct. 2001, pp. 1-14.
Replacement Examiner's Answer to Appeal Brief from U.S. Appl. No. 11/329,999, dated Jan. 31, 2011.
Requirement for Restriction from U.S. Appl. No. 14/177,136, dated May 19, 2014.
Richard et al., "Neural Network Classifiers Estimate Bayesian a-posteriori Probabilities," Neural Computation vol. 3 No. 4, 1991, pp. 461-483.
Russell et al., "Artificial Intelligence: A Modern Approach," Prentice-Hall, Inc., 1995, pp. 531-544.
Russell et al., "Artificial Intelligence: A Modern Approach," Prentice-Hall, Inc., 1995, pp. 70-84.
Russell et al., "Artificial Intelligence: A Modern Approach—Second Edition," Pearson Education, Inc., 2003, pp. 749-752.
Scholkopf, B., "The Kernel Trick for Distances," Technical Report MSR-TR-2000-51, Microsoft Research, May 2000, pp. 1-9.
Schutz et al, "A Comparison of Classifiers and Document Representations for the Routing Problem," Xerox Palo Alto Research Center, 1995, 9 pages.
Shevade et al., "Improvements to Platt's SMO Algorithm for SVM Classifier Design," IEEE Transactions on Neural Networks, vol. 11, No. 5, Sep. 2000, pp. 1188-1193.
Shustorovich et al., "A Subspace Projection Approach to Feature Extraction: The Two-Dimensional Gabor Transform for Character Recognition," Neural Networks, vol. 7, Issue 8, 1994, pp. 1295-1301, Abstract Only.
Shustorovich et al., "Neural Network Positioning and Classification of Handwritten Characters," Neural Networks, vol. 9, Issue 4, Jun. 1996, pp. 685-693, Abstract Only.
Sollich, P., "Bayesian methods for Support Vector Machines: Evidence and Predictive Class Probabilities," Machine Learning, vol. 46, Jan. 2002, pp. 21-52.
Sollich, P., "Probabilistic methods for Support Vector Machines," MIT Press, 2000, 7 pages.
Souafi-Benasfi et al., "Bayesian Networks Classifiers applied to Documents," Proceedings of 16th International Conference on Pattern Recognition, vol. 1, Aug. 2002, pp. 483-486.
Szummer, "Learning From Partially Labeled Data," Doctorate Thesis, Chapter L and Chapter 4, Massachusetts Institute of Technology, Cambridge, MA (USA) Sep. 2002, pp. 1-81.
Thonnat et al., "An Expert System for the Automatic Classification and Description of Zooplanktons from Monocular Images," IEEE 9th International Conference on Pattern Recognition, Nov. 14-17, 1998, vol. 1, pp. 114-118, Abstract Only.
U.S. Appl. No. 13/802,226, filed Mar. 3, 2013.
U.S. Appl. No. 14/225,298, filed Mar. 25, 2014.
U.S. Appl. No. 14/266,671, filed Apr. 30, 2014.
U.S. Appl. No. 14/283,156, filed May 20, 2014.
U.S. Appl. No. 14/334,558, filed Jul. 17, 2014.
Vapnik, "The Nature of Statistical Learning Theory: Second Edition," Springer-Verlag New York, Inc., 2000, pp. 138-142.
Vapnik, V., "Statistics for Engineering and Information Science," Spring-Verlag New York, Inc., 2000, pp. 190-191.
Wang et al., "On Transductive Support Vector Machines," An American Mathematical Society, 2007, pp. 1-9.
Weston et al., "Support Vector Machines for Multi-Class Pattern Recognition," Proceedings of the Seventh European Symposium on Artificial Neural Networks, 1999, pp. 1-6.
Weston et al., "Multi-class Support Vector Machines," CSD-TR-98-04, Royal Holloway, University of London, Egham, UK, May 20, 1998, pp. 1-9.
Wikipedia, "Eight-point algorithm," downloaded from http://en.wikipedia.org/wiki/Eight-point_algorithm, Last Modified on Apr. 18, 2014, pp. 1-7.
Zadrozny et al., "Transforming Classifier Scores into Accurate Multiclass Probability Estimates," Proceedings of the Eighth International Conference on Knowledge Discovery and Data Mining (KDD'02), 2002, pp. 694-699.
Zadrozny, B., "Reducing Multiclass to Binary by Coupling Probability Estimates," Neural Information Processing Systems, 2001, pp. 1-8.
U.S. Appl. No. 14/340,460, filed Jul. 24, 2014.
Non-Final Office Action from U.S. Appl. No. 14/268,876, dated Jul. 24, 2014.
Notice of Allowance from U.S. Appl. No. 14/175,999, dated Aug. 8, 2014.
Requirement for Restriction from U.S. Appl. No. 14/177,136, dated Aug. 15, 2014.
International Search Report and Written Opinion from PCT Application No. PCT/US14/26569, dated Aug. 12, 2014.
Gllavata, et al., "Finding Text in Images Via Local Thresholding," International Symposium on Signal Processing and Information Technology, Dec. 2003, pp. 539-542.
Zunino, et al., "Vector Quantization for License-Plate Location and Image Coding," IEEE Transactions on Industrial Electronics, vol. 47, Issue 1, Feb. 2000, pp. 159-167.
Non-Final Office Action from U.S. Appl. No. 13/740,145, dated Sep. 29, 2014.

(56) References Cited

OTHER PUBLICATIONS

International Search Report and Written Opinion from PCT Application No. PCT/US14/36851, dated Sep. 25, 2014.
Notice of Allowance from U.S. Appl. No. 14/176,006, dated Oct. 1, 2014.
International Search Report and Written Opinion from PCT Application No. PCT/US2014/036673, dated Aug. 28, 2014.
U.S. Appl. No. 14/473,950, filed Aug. 29, 2014.
Notice of Allowance from U.S. Appl. No. 13/740,139, dated Aug. 29, 2014.
Notice of Allowance from U.S. Appl. No. 14/268,876, dated Aug. 29, 2014.
Final Office Action from U.S. Appl. No. 14/176,006, dated Sep. 3, 2014.
Notice of Allowance from U.S. Appl. No. 14/334,558, dated Sep. 10, 2014.
Bishop, C.M., "Neural Networks for Pattern Recognition," Oxford University Press, Inc., 1995, p. 27.
Bishop, C.M., "Neural Networks for Pattern Recognition," Oxford University Press, Inc., 1995, pp. 77-85.
Bishop, C.M., "Neural Networks for Pattern Recognition," Oxford University Press, Inc., 1995, pp. 230-247.
Bishop, C.M., "Neural Networks for Pattern Recognition," Oxford University Press, Inc., 1995, pp. 295-300.
Bishop, C.M., "Neural Networks for Pattern Recognition," Oxford University Press, Inc., 1995, pp. 343-345.
Final Office Action from U.S. Appl. No. 14/220,023, dated Sep. 18, 2014.
International Search Report and Written Opinion from PCT Application No. PCT/US14/35176, dated Sep. 18, 2014.
International Search Report and Written Opinion from PCT Application No. PCT/US14/26597, dated Sep. 19, 2014.
U.S. Appl. No. 14/491,901, filed Sep. 19, 2014.
Final Office Action from U.S. Appl. No. 14/220,029, dated Sep. 26, 2014.
Non-Final Office Action from U.S. Appl. No. 11/752,691, dated Oct. 10, 2014.
Non-Final Office Action from U.S. Appl. No. 13/740,134, dated Oct. 10, 2014.

\* cited by examiner

SMART MOBILE APPLICATION DEVELOPMENT PLATFORM

PRIORITY CLAIM

This application claims priority to Provisional U.S. Provisional Patent Application No. 61/815,210, filed Apr. 23, 2013 and which is herein incorporated by reference.

RELATED APPLICATIONS

This application claims priority to U.S. Pat. No. 6,370,277, granted Apr. 9, 2002 (U.S. patent application Ser. No. 09/206,753, filed Dec. 7, 1998) as well as copending U.S. patent application Ser. No. 13/740,123, filed Jan. 11, 2013; Ser. No. 13/802,226, filed Mar. 13, 2013; Ser. No. 14/209,825, filed Mar. 13, 2014; Ser. No. 14/177,136, filed Feb. 10, 2014; Ser. No. 14/175,999, filed Feb. 7, 2014; Ser. No. 14/220,016, filed Mar. 19, 2014; Ser. No. 14/220,023, filed Mar. 19, 2014 and Ser. No. 14/220,029, filed Mar. 19, 2014; and Provisional U.S. Patent Application No. 61/819,463 filed May 3, 2013; 61/883,865, filed Sep. 27, 2013, and 61/905,063, filed Nov. 15, 2013, each of which are herein incorporated by reference.

FIELD OF INVENTION

The present invention relates to software development, and more particularly to software development platforms for generating and/or modifying applications for use on a mobile device.

BACKGROUND OF THE INVENTION

Mobile technology is rapidly developing, fueling even more rapid development of software capable of exploiting the new and expanded functionality offered by mobile devices. As a result, entire new development communities have arisen to contribute to the expanding pool of software tools available to mobile device users. Large producers of mobile hardware and software have even released software development platforms to the general public and/or provided access to application distribution services to select developers, e.g. via a registration process. To users' great benefit, a wide array of mobile applications designed to perform myriad activities using mobile devices are now readily available for quick download, installation and implementation via mobile communication networks.

The currently available mobile software applications and development platforms provide diverse and powerful functionality to both end-users and developers capable of leveraging the various capabilities of existing mobile devices. However, there is currently no tool available for dynamically developing and employing smart mobile applications capable of adapting to user behavior and/or requirements. For example, current mobile development platforms and/or mobile applications are incapable of transparently determining an appropriate format for processing and outputting data such that the processed data may be seamlessly passed to and/or processed by a subsequent application or algorithm based on prior user activity; such as a user formatting the output and passing the output to the subsequent application or processing algorithm.

Since users cannot dynamically develop and/or process data using currently-available mobile software tools, in order to implement a new or modified process or application, new development effort is required. At best, either new functionality must be encoded into an existing application, or entire new applications must be developed to provide the desired capabilities. At worst, the desired "new" functionality cannot be implemented due to compatibility issues, process limitations, etc. The ultimate result is that end users must wait for development and deployment of the new or modified process (es) or application(s), which is undesirable and even may be unacceptable in some situations.

Moreover, while some users may be capable of developing and/or modifying existing software to perform desired functions, the majority of users do not possess the time or technical expertise to customize software products in this manner. Therefore, valuable input from non-developer users cannot be incorporated into current mobile applications and/or software development platforms without communication between the user(s) and developers, which is inconvenient in some situations and impossible in others. Ultimately, these constraints exclude many individuals from the development community, frustrating or precluding communication between the development community and end users, as well as unnecessarily restricting the available development resources to individuals having significant technical expertise and/or development experience.

Therefore, it would be beneficial to provide systems, methods, and computer program products encompassing a platform for development and use of smart mobile software applications to enable real-time data processing and dynamic application development. It would be a further benefit to enable developers and non-developer users alike to transparently create and/or adapt mobile applications that process data and/or facilitate subsequent processing of the data according to learned criteria such as user behavior and/or requirements. The application is also beneficially capable of dynamically adapting workflow processes in response to various stimuli, enabling a user-oriented experience that provides user-specific benefits tailored to the user's desired activities.

SUMMARY OF THE INVENTION

In one embodiment, a method includes receiving user input defining a workflow comprising one or more activities and one or more rules; receiving user input defining a user interface (UI) configured to facilitate a user performing the workflow at least in part using a processor of a mobile device; and generating a mobile software application based on the workflow and the UI, wherein the workflow is configured to process digital image data based at least in part on the activities and the rules.

In another embodiment, a system includes a processor and logic. The logic is in and/or executable by the processor to cause the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI. The workflow is configured to process digital image data based at least in part on the activities and the rules.

In yet another embodiment, a computer program product includes a computer-readable medium having stored thereon computer readable program code. The computer readable program code is executable by a processor to cause the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI, wherein the workflow is configured to process digital image data based at least in part on the activities and the rules.

In still yet another embodiment, a method includes instantiating a mobile application on a mobile device; launching a workflow within the mobile application, the workflow comprising one or more activities and one or more rules; rendering one or more user interfaces based at least in part on the workflow; displaying at least one of the user interfaces on a display of the mobile device; receiving user input via at least one of the user interfaces; and modifying the workflow based at least in part on the user input. The workflow is configured to process digital image data.

Other aspects and features of the presently disclosed inventive concepts will become apparent from the following detailed descriptions, which should be understood to be illustrative in nature and not limiting on the instant disclosure.

DETAILED DESCRIPTION

Figure 1:
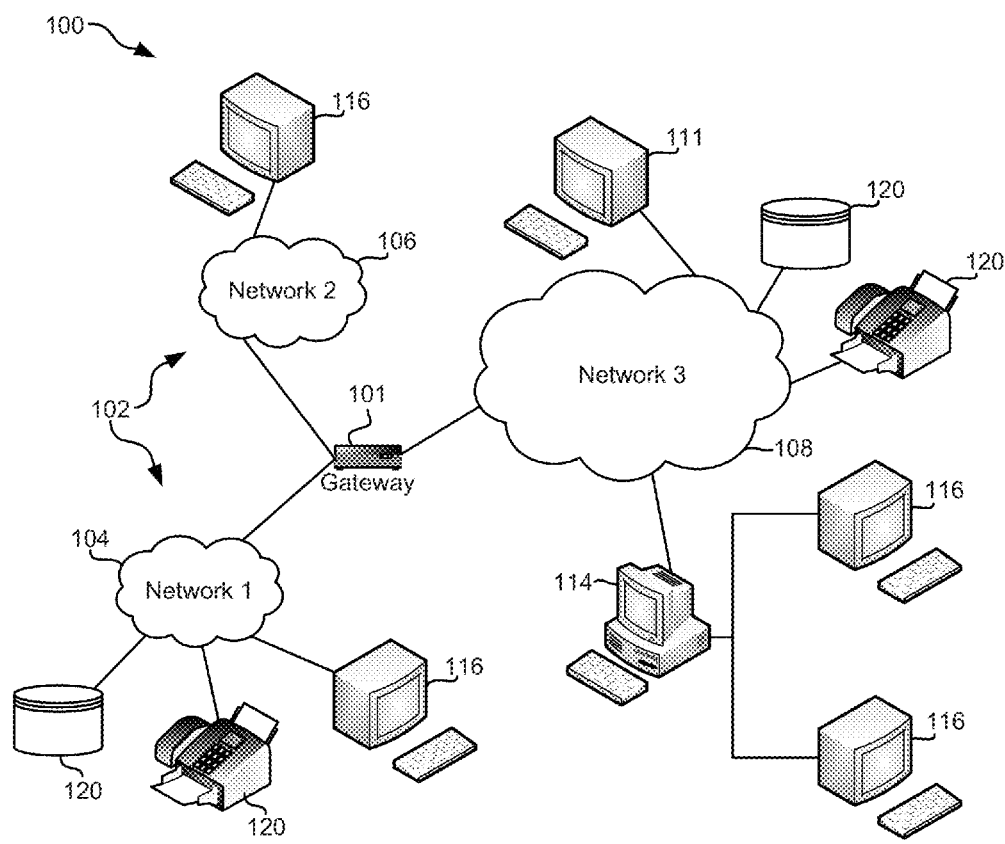
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing. In one high-level implementation, the present disclosures extend mobile capture capabilities to mobile devices via a native mobile application. The mobile user takes a photo of a document using a capture application, which may or may not be part of a larger mobile application, either of which may be built and/or modified at least in part on a mobile capture software development kit (SDK). The capture application exposes an image capture interface which enables the taking of a photograph of an object, preferably under user control, which is then processed with image perfection technology, such as disclosed in related U.S. patent application Ser. No. 13/740,123. The capture application then optionally allows a transfer of the image off device, preferably again under user control. The capture application user experience is embedded in the mobile capture application.

A new paradigm extends processing to mobile devices and simultaneously exposes native mobile operating system services as well as other device native services. A mobile development platform, according to one embodiment, allows the user to define the mobile user experience including the user interface (UI), the sequence of screens presented, how users interact with those screens, and the orchestration of both native device services and server services. The created user experience can be selectively applied to any known device.

In one general embodiment, a method includes receiving user input defining a workflow comprising one or more activities and one or more rules; receiving user input defining a user interface (UI) configured to facilitate a user performing the workflow at least in part using a processor of a mobile device; and generating a mobile software application based on the workflow and the UI, wherein the workflow is configured to process digital image data based at least in part on the activities and the rules.

In another general embodiment, a method includes instantiating a mobile application on a mobile device; launching a workflow within the mobile application, the workflow comprising one or more activities and one or more rules; rendering one or more user interfaces based at least in part on the workflow; displaying at least one of the user interfaces on a display of the mobile device; receiving user input via at least one of the user interfaces; and modifying the workflow based at least in part on the user input, wherein the workflow is configured to process digital image data.

In yet another general embodiment, a system includes a processor; and logic in and/or executable by the processor to cause the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI, wherein the workflow is configured to process digital image data based at least in part on the activities and the rules.

In still yet another general embodiment, a computer program product includes a computer-readable medium having stored thereon computer readable program code executable by a processor to cause the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI, wherein the workflow is configured to process digital image data based at least in part on the activities and the rules.

A user experience for mobile smart application development, in one approach, may be loosely based on the following scenario:

A user defines a process as a set of activities and rules. The process executes by moving from one activity to another in a fixed order or a by a dynamic order as determined by stimuli. Rules are applied at fixed points within the sequence or in response to stimuli. The user also designs UIs independently, with assistance from the development platform, or UIs are rendered automatically by development platform tools to associate with activities that require human interaction.

The process, rules and UI definitions define a mobile user experience by providing both the mobile UI the user sees and interacts with and also the application behavior. The process definition can describe the application behavior because the mobile development platform exposes a federated view of native mobile services and server services. The process executes and transparently orchestrates the execution of native code directly on the device and remote code that resides on a server.

In one embodiment, a user launches a mobile application. The application initiates the process, takes the first activity and renders the defined UI. The user interacts with the UI and completes the activity or provides stimuli, such as "clicking"

a UI button. At this point a rule may be executed or the next activity may be taken/performed. In either case local native services may be accessed, such as the device location being retrieved from the OS or a server service, such as a database lookup, may be used. This provision of native and/or remote services is transparent to the user.

This capability would allow the user to create a dynamic, adaptive mobile user experience that leverages both the local device capabilities and remote server services.

The application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site to perform some or all of the processing operations.

In other approaches, the application may be downloaded in whole or in part and/or run in real-time on the mobile device. For example, the application may be maintained in an online repository. An instance of the mobile application may be transferred to the mobile device automatically, in response to a user request, in response to a new release of the mobile application becoming available in the online repository, etc. In a preferred embodiment, transferring new instances of the mobile application to mobile devices and instantiating those new instances is a process that occurs transparently to the user and without requiring any interaction or instruction from end-users operating the mobile application on mobile devices.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing in whole or in part using the presently disclosed methodologies, systems, etc. may be subjected to any image processing operations disclosed in the aforementioned patent application, such as page detection, rectangularization, detection of uneven illumination, illumination normalization, resolution estimation, blur detection, etc.

In various embodiments, the presently disclosed methods, systems and/or computer program products may utilize and/or include any of the functionalities disclosed in related U.S. patent application Ser. No. 13/802,226, filed Mar. 13, 2013 and Provisional U.S. Patent Application No. 61/780,747, filed Mar. 13, 2013. For example, digital images suitable for processing in whole or in part using the presently disclosed methodologies, systems, etc. may be subjected to any classification and/or data extraction operations disclosed in the aforementioned patent applications, including for instance classifying objects depicted in a digital image according to type based at least in part on characteristics of the object, performing custom-tailored image processing using information about the object characteristics and/or object class, building and/or using feature vectors to perform classification, building and/or using feature vectors to develop a data extraction model for the object and/or object class(es), using data extraction models to extract data from digital images, etc.

In more approaches, the presently disclosed methods, systems, and/or computer program products may be utilized with, implemented in, and/or include one or more user interfaces configured to facilitate performing any functionality disclosed herein and/or in the aforementioned related patent application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, among others that would be appreciated by one having ordinary skill in the art upon reading these descriptions.

It will further be appreciated that embodiments presented herein may be provided in the form of a service deployed on behalf of a customer to offer service on demand.

Images (e.g. pictures, figures, graphical schematics, single frames of movies, videos, films, clips, etc.) are preferably digital images captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof in one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
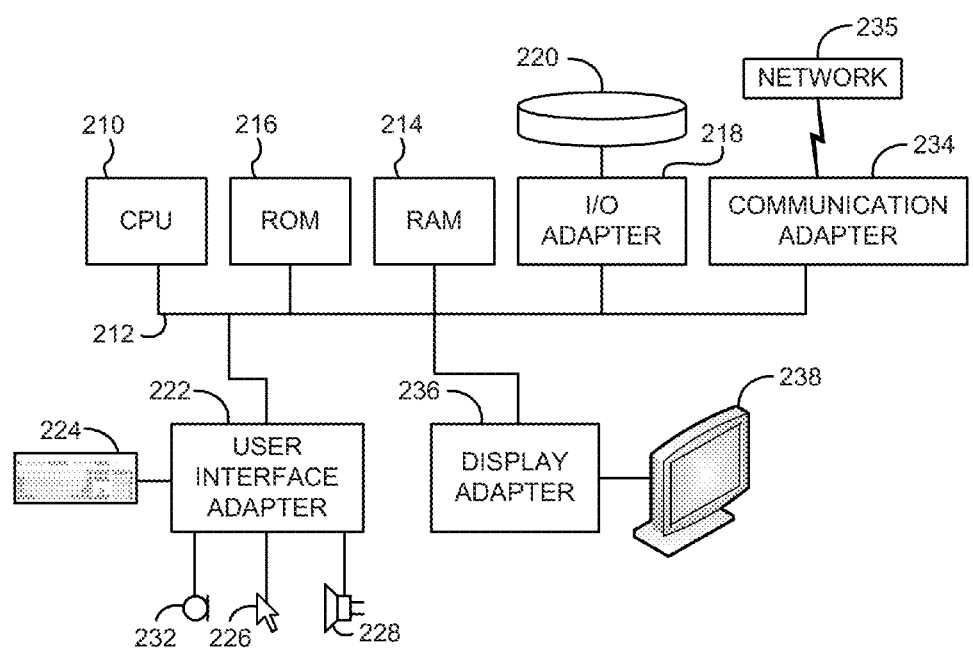
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology.

Object oriented programming (OOP), which has become increasingly used to develop complex applications, may be used.

Mobile Application Development Platform

The presently disclosed inventive concepts may be embodied as systems, methods, and computer program products for developing and/or using mobile applications, e.g. via a mobile application development platform as discussed below with reference to FIG. 3.

Figure 3:
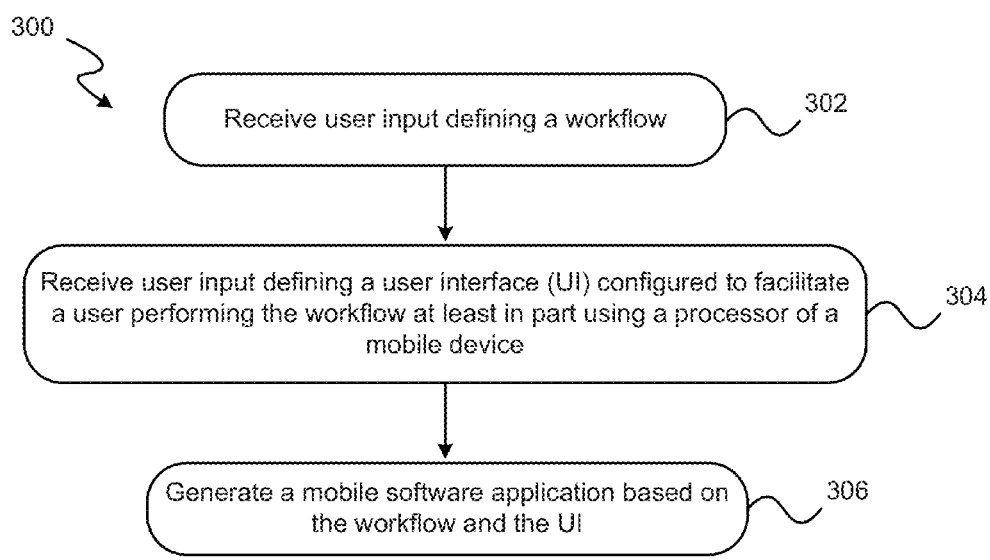
FIG. 3 is a flowchart of a method, according to one embodiment.

In one particular embodiment, such a method 300 is shown in FIG. 3. The method 300 may be performed in any environment, including those depicted in FIGS. 1-2, among others. Moreover, method 300 may include any alternative permutation and/or additional combination of features and/or operations as discussed herein, in various approaches.

In operation 302, user input defining a workflow is received. Preferably, the workflow comprises one or more activities and one or more rules.

In operation 304, user input defining a user interface (UI) configured to facilitate a user performing the workflow at least in part using a processor of mobile device is received.

As understood herein, the user input received in each of operations 302 and/or 304 (as well as any other user input, feedback, data, etc. "received" according to the present descriptions) may be received from any suitable source, location, etc. and in any suitable manner. For example, user input may be received via a hardware component of a mobile device, such as a display configured to receive and/or process tactile feedback. User input may additionally and/or alternatively be tactile feedback in the form of detecting a user interacting with one or more buttons, switches, toggles, etc. of the mobile device or another device in communication with the mobile device. User input may be received via a remote device in communication with the mobile device, such as another mobile device, a workstation, a server, a network component, etc.

In operation 306, a mobile software application is generated based on the workflow and the UI. Notably, the workflow may be configured to process digital image data based at least in part on the activities and the rules.

In some approaches, the activities may include one or more of interactive activities, which may include any activity that requires, receives, or depends upon input from a user, such as displaying data for user review and/or response, requesting data from a user (such as a file name, metadata, processing parameters, etc.), designating process inputs and/or outputs, capturing an image or video, etc. as would be understood by one having ordinary skill in the art upon reading the present descriptions, and non-interactive activities, which include any activity that does not require user input, such as a pre-set image processing analysis pipeline, file format conversion, automated dataset validation, etc. as would be understood by one having ordinary skill in the art upon reading the present descriptions.

In more approaches, the one or more rules facilitate performing one or more of the activities according to a processing scheme. In general, rules dictate the flow of the process from one activity to another in response to stimuli.

The flow of the processing scheme may be static in some embodiments, i.e. a predefined set of operations performed in a predefined order according to a predefined set of criteria and/or parameters.

In additional embodiments, the flow of the processing scheme may be dynamic, i.e. defined, configured, adjusted and/or performed in real-time or near-real time by a user based at least in part on input received from the user. The processing scheme may be dynamically built using activities and/or rules in any desirable manner. For example, activities and/or rules of a dynamic processing scheme may be defined by the user, selected by the user from a predefined set of activities and/or rules, automatically generated based in whole or in part on user responses to one or more inquiries regarding the digital image data and/or processing thereof, automatically generated based on a result of performing a prior activity and/or rule, automatically generated based on previously received user responses to inquiries regarding the present digital image data and/or other digital image data, etc. as would be understood by one having ordinary skill in the art upon reading the present descriptions.

In an illustrative implementation of a dynamic process flow, a user captures a digital image of a document using a camera of a mobile device and instantiates a mobile application development platform (MADP). The user provides input to the MADP via a graphical user interface (GUI) and/or a command line interface (CLI). Users may interact with a GUI in one embodiment by dragging-and-dropping controls onto a form, into a graphically-represented workflow, etc. Users may additionally and/or alternatively design one or more GUIs as part of developing the custom mobile application. Further still, the mobile application development platform may enable users to efficiently integrate custom scripts or code snippets into mobile applications. Users may employ any suitable scripting language without departing from the scope of the present disclosures. In some embodiments the mobile development application includes support for Visual Basic and JavaScript, and HTML5.

In other embodiments, the mobile application development platform may be configured to interface with external development environment(s) and/or platform(s) to facilitate developing mobile applications utilizing functionality of both the presently disclosed platforms and the external development environment(s) and/or platform(s).

The user input defines workflow(s) and/or user interface(s) to facilitate processing the captured digital image of the document and/or similar documents. Based on the user input, the MADP generates a mobile application including a graphical user interface configured to facilitate similar processing of other digital images of documents.

For example, a user wishes to develop a mobile application for processing digital images of driver licenses. The user instantiates the MADP, and defines a workflow comprising activities and rules for driver license image processing according to a static process scheme.

A first rule directs the mobile application to invoke a native image capture functionality of the mobile device upon a user instantiating the mobile application. The native image capture functionality presents a capture interface and prepares integrated mobile device hardware such as the flash bulb and camera lens for performing a capture activity.

A second rule directs the mobile application to invoke an image quality assurance activity that checks for suitable capture conditions, including detecting ambient light levels using a mobile camera, detecting camera stability using native mobile device hardware such as an integrated gyroscope and/or accelerometer, etc.

A third rule directs the mobile application to invoke the capture activity upon determining that suitable capture conditions exist.

A fourth rule directs the mobile application to invoke an image quality control activity that analyzes the captured image using the mobile device processor and software installed on the mobile device to determine whether the captured image is of sufficient quality (e.g. sufficiently illuminated, focused, etc.) for subsequent processing.

A fifth rule directs the mobile application to invoke a preprocessing activity upon determining the captured image is of sufficient quality for processing, and upon determining the captured image is of insufficient quality for processing, to display an error message and repeat the image quality assurance, image capture, and image quality control activities according to the corresponding rules described above.

The preprocessing activity utilizes software installed on the mobile device to prompt a user for processing parameters, and define a processing profile based on the processing parameters. The preprocessing activity displays the captured image and prompts the user to designate the state that issued the driver license depicted in the captured image, as well as characteristics of driver licenses issued by that state.

For example, the user may designate Maryland as the state, and define the location and characteristics of various features on Maryland driver licenses, such as the location of the driver license number and birth date, and the characteristic that both the birth date and the license number are red text appearing on a substantially white background. The user may also designate the location of the licensee's photograph depicted on Maryland driver licenses. The user may designate the location of the state name, and the characteristic that the state name appears in white font on a substantially blue background.

Based on these characteristics, the user may define custom processing parameters for the locations corresponding to the license number and birth date, and define other custom processing parameters for the locations corresponding to the licensee photograph. The custom processing parameters may improve processing results, for example by under-emphasizing red hues when binarizing the license number and birthdate, under-emphasizing blue hues when binarizing the location depicting the state name, and excluding locations depicting the licensee photograph from binarization. Upon receiving the user input defining characteristics of Maryland driver licenses and the corresponding processing parameters, the preprocessing activity synthesizes this information into a processing profile for Maryland driver licenses which may be subsequently utilized to efficiently process other Maryland driver licenses using image processing software services installed on the mobile device (or other mobile devices capable of performing the same image processing software services).

A sixth rule directs the mobile application to invoke an image processing activity, pass the synthesized processing profile to the image processing activity, and to process the digital image according to the processing profile defined via the preprocessing activity.

A seventh rule directs the mobile application to transmit the processed image and associated metadata to a remote server for further processing using services and/or resources in communication with the server. In the driver license scenario, the user may define the seventh rule to transmit the processed image and associated metadata to a credit agency for performing credit check services using the processed image and/or associated metadata. In another use-case scenario, a designer wants to design a mobile app that allows employees of the organization to submit receipts for expenses. To do so, the designer defines a workflow including four steps: (1) capture at least one image of one or more receipts; (2) extract line items from the receipt image(s); (3) validate extracted data; and (4) transmit image(s) and extracted data to an expense reporting system.

In one approach, the designer creates mobile forms for steps 1 and 4 of the workflow. The designer can associate an image enhancement profile with the capture form to be used in step 1. This profile contains various image processing instructions that may be utilized in step 1, such as deskew, despeckle, auto-crop, binarize, etc. as would be understood by the skilled artisan upon reading these descriptions as being advantageous for various receipt submission applications. The form is partially generated by the platform and the designer preferably only needs to add/remove controls and/or associate actions with the desired control(s). The designer may, for example, place two buttons at the bottom of the form labeled "Re-take" and "Use". The designer associates a "mobile capture" action with the "Re-take" button and a "complete activity/take next" action with the "Use" button. Designing a corresponding form for step 3 may be similarly accomplished.

A user installs the organization's "business app" on a mobile device. The "business app" is part of the mobile development platform and includes the native device services that are used by the designer. The user launches the app and engages an authentication interface. Upon authentication, a first screen is displayed, and includes a menu of options such as "Submit receipt." The list of menu items may include any options the user is authorized to use. User authorization may be configured and/or managed using the organization's server(s). The user selects "Submit receipt," which initiates the expense process created by the designer.

The next screen displayed to the user is the form created by the designer that uses the services on the device to operate the device camera, show the viewfinder and the buttons added by the designer. By interacting with this screen, the user takes a picture of the receipt and selects the 'Use' button. The action configured by the designer is triggered, and uses the services on the device to process (e.g. deskew, despeckle, crop, binarize, etc.) the image and upload it to the server. The process activity is completed and the app attempts to take the next process activity.

According to one approach, the server next executes the extract line items activity using the uploaded image. Line items may be extracted in any suitable manner, and in some embodiments may utilize mobile classification and/or mobile extraction functionalities such as discussed in the related patent documentation referenced above.

The app takes the next activity and displays the data validation screen to the user. The user makes any required corrections and selects the "Done" button. In response to detecting this user selection, the activity is completed (e.g. on the mobile device) and, on the server, the "send image and data to expense reporting system" activity is executed.

The foregoing illustrative examples are provided to demonstrate some of them any ways in which a user may define and/or use a mobile application within the scope of the present disclosures, and are not to be considered limiting on the present claims.

Those having ordinary skill in the art will appreciate that the mobile application development platform enables a user to define activities and rules in any desirable manner to generate a desired workflow. The activities and rules may utilize any functionality native to the mobile device, whether conferred via the operating system, optionally installed software, or integrated hardware components. The activities and rules may also utilize any functionality not native to the mobile device, but to which the mobile device has access, e.g. via communicating with a server, network, cellular data service, etc. as would be understood by one having ordinary skill in the art upon reading the present descriptions.

Of course, in various approaches a processing scheme may include some combination of dynamic and/or static processing sub-schemes arranged in a static or dynamic order. For example, several dynamic and/or processing sub-schemes may be arranged to define an overall processing scheme that proceeds from sub-scheme to sub-scheme according to a static flow, but one or more of the sub-schemes may proceed according to a dynamic flow. In other approaches, a plurality of dynamic and/or static sub-schemes may be performed in a dynamic manner according to as would be understood by a skilled artisan upon reading the present descriptions.

In various approaches, stimuli may take any form of feedback or information comprehensible by the mobile device. For example, stimuli may include user input such as tactile input (e.g. a user tapping on the screen, gesturing, interacting with a physical button or switch, etc.), audio input (e.g. a tone, a spoken command or data string, etc.), visual input (e.g. a photograph, video, etc.), etc. as would be understood by one having ordinary skill in the art upon reading the present descriptions.

In another embodiment, the processing scheme is static, e.g., a user defines a set of activities to be performed in a specified order, according to a specified set of instructions, using predefined parameters, etc. Subsequent execution of the processing scheme by another user merely performs the defined activities according to the specified order, instructions, parameters, etc. In this manner, users may quickly and conveniently develop new mobile application(s) to perform various data processing operations using any functionality accessible to the mobile device.

In various approaches, mobile applications within the scope of the present disclosure may perform or utilize functionalities native to the mobile device, such as any functionality native to the mobile device operating system, any functionality imparted by one or more hardware components of the mobile device, etc. as would be understood by one having ordinary skill in the art upon reading the present descriptions. Moreover, mobile applications within the scope of the present disclosure may perform or utilize any function the mobile device is configured to perform or utilize. For example, the presently disclosed embodiments may be configured to interface with any hardware and/or software function installed on the mobile device, such as an image processing application or service, data management application or service.

Those having ordinary skill in the art will appreciate that any function, operation, process, etc. recited herein may be performed using any suitable resource(s), such a mobile device, a remote server, a cloud computing environment, etc. with the preference that the resource performing the activity, operation, process, etc. has access to any hardware component(s) necessary to perform the function, operation, etc. More preferably, the hardware component(s) are integrated into the mobile device. Of course, any suitable approach to obtaining information utilized in performing activities, operations and/or processes that would be understood by one having ordinary skill in the art reading these descriptions may be employed without departing from the scope of the present disclosure.

For example, if a process relies on location information (such as may be obtained using data from a GPS satellite, wireless network connectivity information, etc.), then the resource assigned to perform the activity, operation, function, etc. relying on such location information (e.g. GPS satellite data, WiFi Network name, access point location, etc.) preferably is capable of obtaining the corresponding data. Thus if a process relies on GPS location information, the resource preferably has access to a GPS receiver. Similarly, a mobile device performing an activity, operation, process, etc. relying on stability information preferably has access to an accelerometer and a gyroscope. More preferably, the GPS receiver, accelerometer, gyroscope, etc. is/are integrated into the mobile device.

In a preferred embodiment, applications may be developed, modified, and/or adjusted and distributed in near-real time across a mobile communication network without needing to deploy new instance(s) of the mobile application.

In more embodiments, the processing scheme is dynamic, e.g. the user dynamically defines and/or modifies rules and/or activities in real-time or near real-time while processing an image or other data. In some embodiments, the mobile development platform may receive feedback from a user relating to developing a mobile application, workflow, etc. For example, the mobile development platform may request a user define or select an activity, rule, etc. from a predefined set. The request may be made in response to a user defining a rule, activity, workflow, etc. that has been previously associated with one or more of the activities, rules, etc. in the predefined set.

Similarly, members of the predefined set of rules, activities, etc. may be determined based on prior user interaction with and/or feedback provided to the mobile development platform. Those having ordinary skill in the art reading the present descriptions will appreciate that the mobile application development platform is capable of "learning" user preferences, tendencies, etc. and providing interactive feedback to assist users in developing custom mobile applications suitable to their needs.

In still more embodiments, one or more rules facilitate performing one or more of the activities based on one or more stimuli.

For instance, in one embodiment, rules dictate the sequence of activities performed in an overall workflow, and the workflow may proceed from one activity to another in response to receiving a stimulus and responding to the stimulus according to behavior defined in the rule.

In more embodiments, rules may direct a mobile application to invoke an image capture activity and capture digital image data using a mobile device camera in response to receiving environmental stimuli, e.g. via integrated hardware components such as an accelerometer and a gyroscope. More particularly, the rule may direct the mobile application to capture the digital image data only upon receiving stimuli satisfying specific criteria, e.g. the mobile device being oriented substantially parallel to the ground, the mobile device being stably oriented at a particular angle for a particular duration (e.g. 1-2 seconds) without any significant deviation (e.g. greater than 5 degrees), the mobile device being confined to a particular physical location for a particular duration (i.e. the mobile device being still for a sufficient time to minimize blur), etc. as would be understood by one having ordinary skill in the art upon reading the present descriptions.

Of course, stimuli may take other forms, such as external stimuli, which include user input via an input/output interface (keyboard displayed on the mobile device), a user interacting with a button or switch of the mobile device, interacting with the display of the mobile device, shaking the mobile device, etc. as would be understood by one having ordinary skill in the art upon reading the present descriptions.

As will be appreciated by those having ordinary skill in the art upon reading these descriptions, stimuli within the scope of these disclosures may include one or more of external stimuli and environmental stimuli.

In additional and/or alternative embodiments, method 300 may include any number of optional operations and/or features in any suitable combination as would be comprehended by a skilled artisan reading these descriptions. For example, in one embodiment method 300 may further include: querying one or more hardware components of the mobile device for metadata relating to the digital image data; and receiving the metadata from one or more of the hardware components.

Metadata may be any data relating to the digital image data and capable of being received from a hardware component of the mobile device. For example, metadata may include location information as described above. In one embodiment, the mobile application may, in the course of processing image data such as an image of a driver license or insurance claim, query the mobile device operating system to determine the geographical location of the mobile device.

For example, in one illustrative embodiment the user may utilize the mobile application development platform to generate and/or modify a mobile application to associate a captured image of a driver license or insurance claim with geographical location gathered by the mobile device at the time the image was captured or otherwise associated with the image.

In further embodiments, the user may utilize the mobile application development platform to generate and/or modify a mobile application to include image processing functionality capable of processing images of driver licenses, insurance claims, etc. using custom parameters based at least in part on geographical location. For example, the mobile device may have access to a knowledge base comprising template driver licenses, insurance claims, etc. organized according to geographical location and having associated therewith custom image processing parameters. A user may generate and/or modify a mobile application to retrieve the custom image processing parameters from the database, selecting a template and/or parameters based at least in part on geographical location information associated with the image to be processed.

In another illustrative embodiment, a user may utilize the mobile application development platform to generate and/or modify a mobile application to include document classification functionality capable of classifying documents depicted in digital images based at least in part on geographical location information associated with the image.

Moreover, metadata may be one or more of a mobile device geographical location, a date, a time, a mobile device orientation, mobile device acceleration vector, an audio recording, a video recording, a digital image, one or more alphanumeric characters, and user input i.e. tactile feedback provided via a display, switch, button, etc. of the mobile device.

In an exemplary embodiment, the workflow utilizes one or more of native mobile device services and server services. As understood herein, any operation may be considered a native mobile device service or a server service, interchangeably, with the primary difference being the identity and location of the resource(s) utilized to perform the operation. A native mobile device service is performed using one or more hardware and/or software components of a mobile device, while a server service is performed using one or more resources in communication with a server or network environment remote from the mobile device but with which the mobile device is capable of communicating. Of course, in various embodiments the presently disclosed mobile application development platform is capable of integrating native mobile device services and/or server services in any combination and/or permutation.

Moreover, in some approaches one or more operations may be performed using a combination of native mobile device services and server services. For example, a user initiates an operation utilizing native mobile device services. However, due to high computational cost (or other factors as would be appreciated by one having ordinary skill in the art upon reading the present descriptions), performing the operation utilizing only native mobile device services would be undesirably inefficient or take an undesirable amount of processing resources or time.

Thus, after a certain threshold of processing resources are consumed by the native mobile device services, or after a threshold duration of processing time has elapsed, the workflow may shift the operation and instead utilize server services, which generally will have greater available processing power than native mobile device services. In this manner, an operation may be performed utilizing the most efficient resources available, whether at the direction of the user or in a process that is transparent to the user.

While the presently disclosed systems, methods, and computer program products are suitable for use in a wide variety of applications and/or implementations, one particularly advantageous implementation of these concepts is in the field of digital image processing, and more particularly as relating to the processing of digital documents and/or images depicting documents.

As such, in some approaches the digital image data represents a document, and methods, systems and computer program products disclosed herein may further involve capturing the digital image data. Accordingly, in one particularly preferred approach, the user input defining the workflow relates to the document, the user input defining the user interface relates to the document, and the workflow is configured to process the digital image of the document utilizing one or more of native mobile device services and server services.

Moreover, the digital image data may represent a document having one or more unique characteristics, and the workflow may thus be advantageously configured to classify the document according to at least one of the unique characteristics.

Utilizing/Modifying a Mobile Application Developed Via the Mobile Application Development Platform The presently disclosed inventive concepts may be embodied as systems, methods, and computer program products for using mobile applications, e.g. via a mobile application development platform as discussed below with reference to FIG. 4.

Figure 4:
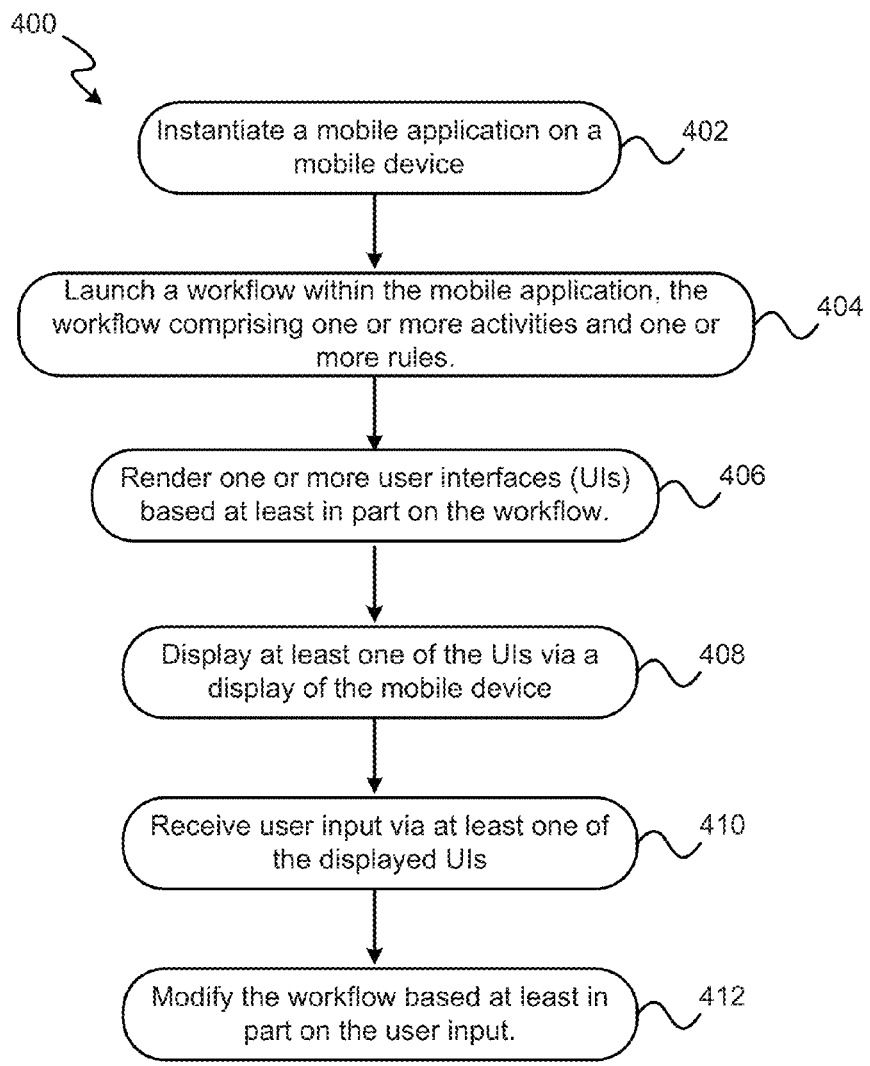
FIG. 4 is a flowchart of a method, according to one embodiment.

In one particular embodiment, such a method 400 is shown in FIG. 4. The method 400 may be performed in any environment, including those depicted in FIGS. 1-2, among others. Moreover, method 400 may include any alternative permutation and/or additional combination of features and/or operations as discussed herein, in various approaches.

In operation 402, a mobile application is instantiated on a mobile device. The mobile application may be instantiated in any suitable manner, such as in response to user input, in response to a call or request from another application and/or process being performed by the mobile device and/or another device in communication with the mobile device. Equivalent ways of instantiating mobile applications on mobile devices, such as would be understood by those having ordinary skill in the art upon reading the present descriptions are also within the scope of this disclosure.

In operation 404, a workflow is launched within the mobile application, the workflow comprising one or more activities and one or more rules.

In operation 406, one or more user interfaces are rendered, the rendering being based at least in part on the workflow. Rendering the defined user interface, in various embodiments, may be based on instructions from the user that defined the process, based on an auto-rendering capability, etc. For example, a user may define the user interface explicitly or allow the development platform to generate the UI automatically. In either case, what gets created is a package of HTML and JavaScript instructions that the device can interpret to create a user interface and including buttons and images and backgrounds, etc.

When utilizing auto-render capabilities, the application may utilize an algorithm that looks at what information is the activity is the information trying to collect. So we tend to call those fields. In one example, the user enters five pieces of data or reviews five pieces of data. The algorithm may create a form that has five fields with five labels and in the case of the review, text may be placed into each of those five fields and/or presented to the user, for instance with a button that allows the user to accept, reject, modify or negate the text.

In operation 408, at least one of the user interfaces is displayed via a display of the mobile device.

In operation 410, user input is received via at least one of the user interfaces.

In operation 412, the workflow is modified based at least in part on the user input.

In some approaches, modifying the workflow includes interfacing the mobile application with a mobile application development platform. In other approaches, the workflow additionally and/or alternatively utilizes one or more of native mobile device services and server services.

In any given approach, the workflow may be configured to process digital image data. The digital image data may be or include a digital representation of a document. As such, method 400 may include, in some embodiments, capturing the digital image data.

Where digital image data corresponds to a digital representation of a document, the user input defining the workflow and/or the user input defining the user interface may each be related to the document, singly or in unison. Moreover, the workflow may be configured to process the digital image of the document utilizing one or more of native mobile device services and server services.

The digital image data optionally represents a document having one or more unique characteristics. In these circumstances, the workflow may preferably be configured to classify the document according to at least one of the unique characteristics.

Preferably, the workflow is configured to process digital image data based at least in part on the activities and the rules. Further, the activities may include one or more of interactive activities and non-interactive activities; while the one or more rules facilitate performing one or more of the activities according to a processing scheme. In some approaches, the processing scheme is either static or dynamic, while in other approaches the processing scheme may be partially static and partially dynamic.

In some approaches, one or more of the rules facilitate performing one or more of the activities based on one or more stimuli, such as external stimuli and environmental stimuli.

Moreover, method 400 may include querying one or more hardware components of the mobile device for metadata relating to the digital image data, in one embodiment. The metadata may be received from one or more of the hardware components. The metadata may include mobile device geographical location information, date and/or time information, mobile device orientation information, mobile device acceleration vector information, an audio recording, a video recording, a digital image, one or more alphanumeric characters, and user input, in various approaches.

User Enrollment

In one particularly preferred variety of embodiments, the presently disclosed inventive concepts may be implemented to define one or more dynamic workflow(s), e.g. as a mobile application. The dynamic workflow(s) are preferably configured to facilitate user interaction with a third-party service, e.g. a financial service. The third-party service may include a plurality of constituent services also facilitated via the specifically-configured mobile application, as described in further detail below.

The dynamic workflows may be defined using one or more interfaces provided via the smart development platform. Preferably, the development platform facilitates design and implementation of a plurality of forms to define the dynamic workflow and any associated rules, activities, etc. The user may leverage the development platform to design a series of interactive forms leveraging the activities, rules, etc. of the dynamic workflow to provide a functional application useful to an end user.

For example, in one approach the smart development platform may be utilized to develop a mobile application configured to facilitate financial activities. The user interacts with the interfaces provided via the smart development platform to design a series of forms including an authentication authorization form or interface, one or more data entry and/or data capture form(s) or interface(s), one or more data review form(s) or interface(s), and one or more prompts, etc. as would be understood by one having ordinary skill in the art upon reading the present descriptions.

The exemplary approach set forth above may be embodied, for example, in a user-developed dynamic workflow that utilizes an authentication form, a capture form, a review form, and a submission/confirmation prompt.

The authentication form, in one approach, may be a "title" screen or a first interface displayed to a user after launching, switching focus to, or otherwise invoking the mobile application. The authentication form may be configured to include one or more buttons, fields, switches, etc.

The buttons may include, for example, a "login" button with which a user may interact to provide authentication information associated with an existing account or account(s), a "new" or "apply" button configured to facilitate the user engaging in a new account application or account opening process, one or more information buttons (e.g. "contact us," "locations," "about," etc.) configured to facilitate displaying information to the user such as a list of physical locations where the service provider may be located, contact information for the service provider, version, compatibility, or other technical information for the mobile application, etc. as would be understood by one having ordinary skill in the art upon reading the present descriptions.

The user may in one approach interact with the login button and provide corresponding account information, e.g. a username and password, account number, security image, signature, or any other form of authenticating information, as would be appreciated by skilled artisans reading the instant descriptions. Upon providing the appropriate account information, the user is directed to an interface where the account(s) under the user's control may be managed or otherwise interacted with via the mobile application.

In more approaches, the user may instead (or in addition) seek a new service or account by interacting with the "new" or "apply" button as described above. The user is then directed to a capture interface that enables the user to capture information requisite to the application process. The requisite information may be manually input by the user, e.g. via a physical or virtual keyboard on the mobile device, and/or input via image data depicting some or all of the requisite information. Accordingly, the capture interface may take any suitable form in the particular context advantageous to the dynamic workflow in connection with which the mobile application is to be utilized.

For example, in preferred approaches the Capture Interface may substantially represent a viewfinder of a digital camera (e.g. on a mobile phone). The capture interface may even more preferably leverage an existing image capture interface native to the mobile device upon which the mobile application is implemented. Even more preferably, the capture interface includes one or more additional functions not native to the mobile device, such as one or more prompts providing relevant feedback to a user about the suitability of environmental conditions (e.g. lighting, focus, device orientation, field-of-view, etc.) to a requested data capture operation. The capture interface may also include additional functions such as an automatic or "continuous" capture capability that automatically acquires image data via the mobile device image sensor(s) upon detecting the existence of one or more optimal data capture conditions. Of course, the capture interface includes a function enabling a user to manually capture data according to the user's preference and using the mobile device components (e.g. a camera button in the case of manually capturing image data).

Sensors as described herein in various embodiments should be understood as potentially including any combination of image sensor(s) described herein and/or as would be understood by a skilled artisan as conventionally included in a mobile device. Exemplary sensors include audio sensors such as a microphone, motion sensor(s) such as an accelerometer and/or gyroscope, etc. as would be understood by a skilled artisan reading the present descriptions.

In some approaches, the capture form or interface may preferably include customizable features and corresponding controls for the user, e.g. allowing a user to modify a size or location of the capture "window" defined by viewfinder "corners", modify the value or acceptable range of values for conditions sensed during a "continuous" capture operation (e.g. acceptable device orientation, angle, stability duration, etc.).

Regardless of whether data are captured via one or more sensors of the mobile device, manually input by the user, obtained via a lookup operation using external data sources, or any other data capture technique, the mobile application preferably provides an indication to the user upon capturing the data, and provides the user with the ability to review accept, modify and/or reject the captured data via a Review Form or Interface. In some approaches, this interface may be referred to as a "preview" interface, especially when the interface is invoked prior to submitting data for final review, approval, processing, etc. via the appropriate workflow(s).

Preferably, the review form or interface includes at least a preview of the captured data (e.g. a preview of an imaged document or typed word(s)) and a plurality of buttons or actions. For example, in a minimalist approach the review interface may include a "recapture" "reject" or "discard" button configured to reject previously captured/input data and repeat the capture process; and a "save," "use" or "accept" button configured to designate the captured data for subsequent use in a dynamic workflow or smart mobile application.

The "save" button may be further configured, in preferred but optional approaches, to assist a user in improving the quality of the captured data for subsequent use in the context of the associated workflow. For example, assistance and/or quality improvement may include formatting the captured data in a manner specifically tailored to enable or assist subsequent processing or use thereof, (pre)processing data according to one or more procedures designed to improve or enhance desired data among the entirety of the captured data, such as specifically enhancing the appearance of black text characters on a document having a white background, and which was imaged on a wooden surface with a dark, glossy finish. In this example, the enhancement may include suppressing color data and enhancing the binary (black/white) distinctions between the text and the document background.

Of course, in other implementations, other enhancements may be advantageous or desirable. Continuing with the exemplary case of imaging documents, other useful enhancements may include functions such as modifying a page orientation, detecting uneven illumination, balancing uneven illumination, modifying document dimensions (i.e. edge positions, lengths) to adjust for perspective skew or "fishbowl" effects, modifying parameters associated with detecting page edges, optimal capture conditions (e.g. maximum device orientation angle, minimum stability duration, etc.). Any of these advantageous enhancements may be manually invoked via the review interface, and/or designated for automatic performance in response to capturing appropriate data.

In addition to the review interface described above in association with captured data, exemplary workflows developed using a dynamic smart mobile platform as described herein may optionally include an additional data input and/or verification interface. The additional data input and/or verification interface preferably represents a web page or form, and includes fields displaying captured information and fields enabling/facilitating the user confirming, negating, and/or modifying the captured information in the captured information fields. For example, in one approach the additional data input/verification interface includes a list of fields, each identified by a "type" label (e.g. "First" "Last" "MI" "Date of Birth" "Address" etc.) and accompanied by an indicator such as a check box and/or a manual text entry field. The user may then review each item of captured information, verify the accuracy thereof (both with respect to the "type" identified and with respect to the accurate representation of the specific value in the field) and either accept the captured information as "accurate," reject the captured information outright, or input modified information accordingly.

Finally, in a preferred approach the mobile application developed using the presently described smart platform includes a legal interface, which essentially enables display of any pertinent legal information and/or to receive any required authorization from the user of the mobile application. The legal interface is preferably embodied as a form comprising text of the pertinent legal issues (e.g. terms and conditions of a license) and two buttons with which a user may interact—an accept/agree button and a decline/disagree button. The user may only complete the processing performed via the mobile application upon accepting the terms of the legal agreement(s) displayed via the legal interface, in some approaches.

In general, and as described above, a user interacting with the presently disclosed mobile application may be enabled to remotely conduct any number of activities that would be possible if the user were present at a physical location where the financial service provider conducts business.

Continuing with the exemplary scenario where a user wishes to engage one or more financial services, a user interacting with a mobile application as described herein may remotely perform any action and/or engage the service provider in any manner, context, or capacity that typically requires the user's physical presence at a service location.

For example, in some approaches the user may engage the financial mobile application to obtain and/or perform banking services such as depositing, withdrawing and/or transferring funds to and/or from one or more accounts owned or controlled by the user, making payments from an account under the user's control, link one or more user-controlled accounts to one or more external services, transactions, etc. (e.g. liking a bank account to an electronic payment service such as an electronic utility bill payment service, consumer payment service like PayPal, etc. as would be understood by one having ordinary skill in the art upon reading the present descriptions.

In more approaches, the user may also interact with the mobile application to facilitate opening, closing and/or modifying accounts under the user's authority to control. In some instances, the financial institution providing the financial services may implement security procedures that limit the capabilities offered with respect to a particular type of user, account, etc.

For example, in one embodiment a mobile application enabling a user to apply for a new account and/or an associated service may be deemed a "limited user" and accordingly prohibited or given only restricted access to sensitive actions, functions, etc. Illustrative scenarios where a "limited user" or analogous restriction may be utilized include a user attempting to withdraw funds from a loan for which the user has applied (but not yet been approved); a user attempting to withdraw funds from an account having a pending balance that has not yet cleared; a user attempting to administer an account for which a user is authorized to make deposits/withdrawals but for which the user is not authorized to view or modify account holder information, etc. as would be understood by one having ordinary skill in the art upon reading the present descriptions.

Further still, in some approaches the user may utilize the mobile application to apply for various types of services provided by the financial institution, such as applying for a loan or line of credit (or extension of existing loan or line of credit), applying for a new account (and/or changing an account status or type from one category to another, e.g. business to personal, checking to savings, etc.) requesting a credit report, etc. as would be understood by one having ordinary skill in the art upon reading the present descriptions.

As noted above, the presently disclosed inventive concepts may be implemented as a system. In one embodiment, such an exemplary system includes a processor; and logic in and/or executable by the processor. Specifically, the logic causes the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI, where the workflow is configured to process digital image data based at least in part on the activities and the rules.

As similarly noted above, the presently disclosed inventive concepts may be implemented as a computer program product. In one embodiment, such an exemplary computer program product includes a computer-readable medium having stored thereon computer readable program code executable by a processor to cause the processor to: receive user input defining a workflow comprising one or more activities and one or more rules; receive user input defining a user interface (UI) configured to facilitate a user performing the workflow at least in part using a processor of mobile device; and generate a mobile software application based on the workflow and the UI, where the workflow is configured to process digital image data based at least in part on the activities and the rules.

In some approaches, the presently described systems, methods, and computer program products may utilize and/or be deployed in whole or in part as part of a VPN platform or a work platform to use as a tool to build mobile applications screens that display information similar to what users might see, and to define and/or determine (previously or in real-time) the subsequent information and/or screens a user may next be presented based on user interaction with the previous screen and the rules that were orchestrated with the business flow that was created.

The present descriptions provide guidance to creating new, intuitive tools for users to build mobile business apps based on specific associated processes, a dynamic mobile smart application. In some embodiments, the application is not static, so a user/developer can orchestrate the associated process through, for example, a mobile device. The user can go back in and change the associated process, and instantiations of that process and/or application would inherit those changes almost immediately, preferably deploying another instance of that application.

An additional feature is allowing that application that was built and orchestrated to actually interact with the hardware on the device and our mobile technology on the device to process information, e.g. to physically capture the document or classify an extraction information utilize other available information such as GPS information. In various embodiments, the application is not just a static workflow, it is a mutable workflow that can evoke and exploit any available mobile capture, mobile classification and/or mobile extraction functionality such as discussed in the related patent documentation referenced above. These embodiments thus enable a class of mobile applications that are not only dynamic, but applications can easily create new workflows and/or applications to acquire and/or understand information in real time.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
receiving user input defining a workflow comprising one or more activities and one or more rules;
receiving user input defining a user interface (UI) configured to facilitate a user performing the workflow at least in part using a processor of a mobile device; and
generating a mobile software application based on the workflow and the UI,
wherein the workflow is configured to:
process digital image data based at least in part on the activities and the rules; and
classify an object represented in the digital image data, the classifying comprising:
generating a feature vector based on the digital image data;
comparing the feature vector to a plurality of reference feature matrices; and classifying the object depicted in the digital image data as a member of a particular object class based at least in part on the comparison.

2. The method as recited in claim 1, wherein the activities comprise one or more of interactive activities and non-interactive activities.

3. The method as recited in claim 1, wherein the one or more rules facilitate performing one or more of the activities according to either: a static processing scheme or a dynamic processing scheme.

4. The method as recited in claim 1, wherein at least one of the rules invokes an image capture activity utilizing the mobile device.

5. The method as recited in claim 4, wherein the one or more rules invoke the image capture activity in response to receiving environmental stimuli from at least one integrated hardware component of the mobile device, and
wherein the environmental stimuli indicate one or more of an orientation and a stability of the mobile device.

6. The method as recited in claim 1 wherein one or more rules facilitate performing one or more of the activities based on one or more stimuli, and wherein the stimuli comprise one or more of external stimuli and environmental stimuli.

7. The method as recited in claim 1, further comprising:
querying one or more hardware components of the mobile device for metadata relating to the digital image data; and
receiving the metadata from one or more of the hardware components.

8. The method as recited in claim 7, wherein the metadata comprise one or more of:
a mobile device geographical location,
a date,
a time,
a mobile device orientation,
a mobile device acceleration vector,
an audio recording,
a video recording,
a digital image,
one or more alphanumeric characters, and
user input.

9. The method as recited in claim 1, wherein the workflow utilizes one or more of native mobile device services and server services.

10. The method as recited in claim 1, wherein the digital image data represents a document.

11. The method as recited in claim 10, further comprising capturing the digital image data,
wherein the user input defining the workflow relates to the document,
wherein the user input defining the user interface relates to the document, and
wherein the workflow is configured to process the digital image data utilizing one or more of native mobile device services and server services.

12. The method as recited in claim 11, wherein the digital image data represents a document having one or more unique characteristics, and
wherein the workflow is configured to classify the document according to at least one of the unique characteristics.

13. A method, comprising:
instantiating a mobile application on a mobile device;
launching a workflow within the mobile application, the workflow comprising one or more activities and one or more rules;
rendering one or more user interfaces based at least in part on the workflow;
displaying at least one of the user interfaces on a display of the mobile device;
receiving user input via at least one of the user interfaces; and
modifying the workflow based at least in part on the user input,
wherein the workflow is configured to:
process digital image data captured using a camera of the mobile device;
query one or more integrated hardware components of the mobile device for metadata relating to the digital image data; and
receive the metadata from one or more of the integrated hardware components.

14. The method as recited in claim 13, wherein modifying the workflow comprises interfacing the mobile application with a mobile application development platform.

15. The method as recited in claim 13, wherein the workflow utilizes one or more of native mobile device services and server services.

16. The method as recited in claim 13, wherein the digital image data comprises a digital representation of a document.

17. The method as recited in claim 13, wherein the workflow is configured to process digital image data based at least in part on the activities and the rules.

18. The method as recited in claim 13, wherein the activities comprise one or more of interactive activities and non-interactive activities.

19. The method as recited in claim 13, wherein the one or more rules facilitate performing one or more of the activities according to a processing scheme.

20. The method as recited in claim 19, wherein the processing scheme is either static or dynamic.

21. The method as recited in claim 19, wherein the processing scheme is partially static and partially dynamic.

22. The method as recited in claim 13, wherein one or more rules facilitate performing one or more of the activities based on one or more stimuli.

23. The method as recited in claim 22, wherein the stimuli comprise one or more of external stimuli and environmental stimuli.

24. The method as recited in claim 13, further comprising:
querying one or more hardware components of the mobile device for metadata relating to the digital image data; and
receiving the metadata from one or more of the hardware components.

25. The method as recited in claim 24, wherein the metadata comprise one or more of a mobile device geographical location, a date, a time, a mobile device orientation, mobile device acceleration vector, an audio recording, a video recording, a digital image, one or more alphanumeric characters, and user input.

26. A method, comprising:
capturing digital image data,
instantiating a mobile application on a mobile device;
launching a workflow within the mobile application, the workflow comprising one or more activities and one or more rules;
rendering one or more user interfaces based at least in part on the workflow;
displaying at least one of the user interfaces on a display of the mobile device;
receiving user input via at least one of the user interfaces; and modifying the workflow based at least in part on the user input, wherein the workflow is configured to process the digital image data, wherein the digital image data comprises a digital representation of a document, wherein the user input defining the workflow relates to the document, wherein the user input defining the user interface relates to the document, and wherein the workflow is configured to process the digital image data utilizing one or more of native mobile device services and server services.

27. The method as recited in claim 26, wherein the digital image data represents a document having one or more unique characteristics, and wherein the workflow is configured to classify the document according to at least one of the unique characteristics.

\* \* \* \* \*